United States Patent

Hayashi

[11] Patent Number: 6,064,733
[45] Date of Patent: May 16, 2000

[54] ECHO CANCELLER APPARATUS

[75] Inventor: Kensuke Hayashi, Tokyo, Japan

[73] Assignee: NEC Corporation, Tokyo, Japan

[21] Appl. No.: 08/940,381

[22] Filed: Sep. 30, 1997

[30] Foreign Application Priority Data

Oct. 28, 1996 [JP] Japan .................................. 8-285418

[51] Int. Cl.[7] .................................................. H04M 9/00
[52] U.S. Cl. ........................ 379/410; 379/406; 379/408; 370/292
[58] Field of Search .................................... 379/410, 406, 379/408, 409, 365; 370/505, 509, 286, 292

[56] References Cited

U.S. PATENT DOCUMENTS

| | | | |
|---|---|---|---|
| 4,074,086 | 2/1978 | Falconer et al. | 379/410 |
| 4,742,510 | 5/1988 | Quatieri, Jr. et al. | 379/410 |
| 4,813,073 | 3/1989 | Ling | 379/410 |
| 4,970,715 | 11/1990 | McMahan | 379/410 |
| 5,113,389 | 5/1992 | Cox | 379/406 |
| 5,113,395 | 5/1992 | Murakami et al. | 370/509 |
| 5,124,976 | 6/1992 | Lemaistre et al. | 370/509 |
| 5,481,564 | 1/1996 | Kakuishi et al. | 375/230 |
| 5,848,061 | 12/1998 | Hasegawa | 379/408 |

FOREIGN PATENT DOCUMENTS

| | | |
|---|---|---|
| 62-171329 | 7/1987 | Japan . |
| 1-123535 | 5/1989 | Japan . |
| 2-143614 | 6/1990 | Japan . |
| 2-143615 | 6/1990 | Japan . |
| 2-202128 | 8/1990 | Japan . |
| 2-288426 | 11/1990 | Japan . |
| 2-288427 | 11/1990 | Japan . |
| 5-41680 | 2/1993 | Japan . |

*Primary Examiner*—Forester W. Isen
*Assistant Examiner*—Jacques M. Saint-Surin
*Attorney, Agent, or Firm*—Young & Thompson

[57] ABSTRACT

An echo canceller apparatus consists of a frame aligner circuit and an echo canceller. The frame aligner circuit forcibly generates a data slip of a receive input signal by a recursive buffer of a FIFO when a slip between timings of receive and transmit clocks is accumulated. A data slip detection circuit outputs its detection of the data slip to an adaptation correction section of the echo canceller. In the adaptation correction section, when the data slip of the receive input signal is detected depending on the output of the data slip detection circuit, a correction operation is performed so that a delay by N taps is increased in an impulse response of an H-register, thereby canceling an echo.

3 Claims, 3 Drawing Sheets

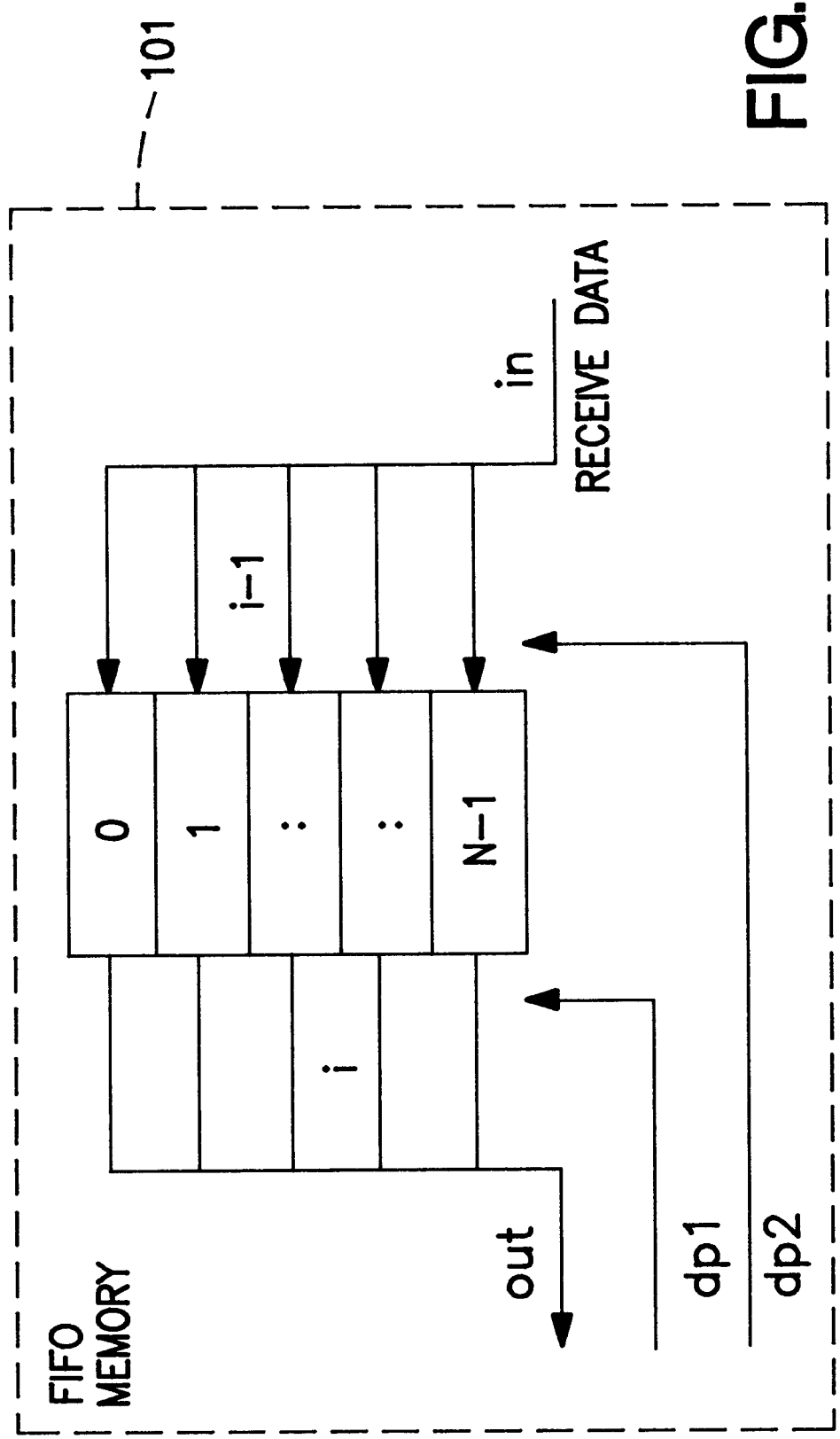

ECHO CANCELLER APPARATUS

BACKGROUND OF THE INVENTION

1. Field of the Invention

The present invention relates to an echo canceller apparatus, more particularly to an echo canceller which corrects a receive clock and a transmit clock which are asynchronous with each other.

2. Description of the Related Art

As is disclosed, for example, in Japanese Patent Application Laid Open No. 7-202767, this kind of echo canceller apparatus has been used to absorb a slip between timings of receive and transmit systems and to cancel a near-end echo signal from a transmit input signal using a signal of a receive system as a reference signal, in a digital four-wire path in which clocks of the receive system and that of the transmit system are asynchronous.

FIG. 1 is a block diagram showing an example of a conventional echo cancller apparatus. The echo canceller apparatus consists of a memory of a FIFO style (hereinafter referred to as FIFO) 311; a delay device 312 for delaying an enable signal; an A/D converter 314 for performing a digital conversion for a transmit input signal; an echo canceller 315; a selection circuit 316; and a fixed data generator 317.

The FIFO 311 has a capability of writing digital receive data at a timing of its receive clock and reading it at a timing of its transmit clock. Moreover, an enable signal En and a delayed enable signal DEn which has been delayed by the delay device 312 by a predetermined sampling time are input to the FIFO 311. The FIFO 311 is reset by starting-up of the enable signal En to start a writing operation for the receive data and the FIFO 311 starts a reading operation for it by the starting-up of the delayed enable signal DEn.

The enable signal En is a control signal showing whether the receive data is effective or ineffective. For example, a voice level detection is conducted on the transmit side to decide whether voice is effective or ineffective.

The delayed enable signal DEn which has been delayed by a predetermined sampling period by the delay device 312 is input to the selection circuit 316. The selection circuit 316 selects one of the outputs from the FIFO 311 and the fixed data generator 317 based on the delay enable signal DEn.

The fixed data generator 317 is a circuit which generates direct current data at a control signal level. The D/A converter 313 performs an analog conversion for the output selected by the selection circuit 316 and transmits it as a received output. The A/D converter 314 performs a digital conversion for a transmit input signal at a transmit timing and outputs it to an echo canceller 315.

The echo canceller 315 receives the output from the selection circuit 316 as a reference signal. Therefore, the echo canceller 315 receives the receive data as a reference signal, the receive data being read out from the FIFO 311 at a transmit timing. The echo canceller 315 removes an echo component from the digital transmit data output from the A/D converter 314 and transmits the transmit data.

Next, an operation of the foregoing echo canceller apparatus will be described. First, when the enable signal En is at a voice ineffective period, the delayed enable signal DEn is also at the voice ineffective period. Therefore, the selection circuit 316 selects the direct current data which are output from the fixed data generator 317 and outputs it to the D/A converter 313. Then, when the enable signal En enters the voice effective period, the FIFO 311 is initialized in synchronization with the starting-up of the enable signal En and the receive data is written to the FIFO 311 according to the receive timing.

On the other hand, when the delayed enable signal DEn enters the voice effective period, the FIFO 311 performs reading-out of the receive data, which had previously been according to the transmit data timing in parallel with the writing operation of the receive data. The reading operation of the receive data is continuously performed during the voice effective period of the delay enable signal DEn.

The receive data which is read out according to the timing of the transmit clocks as described above is converted to an analog signal by the A/D converter 313 and is transmitted. Also, the echo canceller 315 removes the echo component from the transmit data using this receive data as a reference signal.

Subsequently, when the delayed enable signal DEn enters the voice ineffective period, the selection circuit 316 switches the selection from the FIFO 311 to the fixed data generator 317 again to stop the output from the FIFO 311 and outputs the direct current data output from the fixed data generator 317 to the D/A converter 313.

It is possible to absorb the slip between the writing timing of the receive data (receive timing) and the reading timing (transmit timing) for the FIFO 311 by controlling the writing and reading operations of the FIFO 311 using the enable and delayed enable signals En and DEn, even though both timings are asynchronous with each other.

In the foregoing prior arts, when it is decided that the receive input signal is at the voice effective period for a long time because background noises at a predetermined level or more are included in the receive input signal, a capacity limitation of the FIFO is exceeded. Therefore, since normal operations of the writing of the receive input signal by the timing of the receive clock and the reading of it by the timing of the transmit clock are not compensated, if the voice effective period of the receive input signal continues for a long time, the slip between the receive and transmit clocks is accumulated. As a result, it becomes impossible to absorb the timing slip which accumulated between them.

Moreover, by transiting from the voice effective period to the voice ineffective period, a variation in an apparent echo path is produced in the echo canceller. Therefore, the transition from the voice effective period to the voice ineffective period produces a data slip in the receive input signal, whereby an echo estimation operation of the echo canceller falls into disorder so that an echo is not canceled at a time.

SUMMARY OF THE INVENTION

The object of the present invention is to provide an echo canceller apparatus which performs an echo cancel when a data slip is generated due to an accumulation of a slip between a receive clock timing and a transmit clock timing.

In an echo canceller apparatus of the present invention, which is located at a four-wire path in which a receive clock and a transmit clock are asynchronous with each other, the echo canceller apparatus comprises:

a frame aligner circuit which writes a receive input signal at a timing of a receive clock and reads it out at a timing of a transmit clock to absorb an accumulation of a slip between timings of said receive clock and said transmit clock, and transmits a data slip recognition signal indicating a generation of a data slip of said receive input signal when the slip exceeds a maximum capacity as a result of the accumulation of the timings; and an echo canceller which receives said receive input signal as a reference input signal, estimates an echo component included in said receive input signal to remove the echo component when said data slip recognition signal output at the time of the generation of the data slip of said receive input signal is input thereto, and thereby cancels an echo signal at the time of the generation of the data slip from a transmit input signal.

In the foregoing echo canceller apparatus, the frame aligner circuit writes the receive input signal at the timing of the receive clock and reads it out at the timing of the transmit clock, thereby correcting the slip between the timings of the receive and transmit clocks. When the slip of the timings is accumulated exceeding the maximum capacity for accumulating, the frame aligner circuit allows the receive input signal to generate the data slip. At this time, when the data slip of the receive input signal is detected, the echo canceller corrects an estimation echo path. Therefore, the echo canceling can be performed at the time of the generation of the data slip of the receive input signal.

Furthermore, according to the present invention, the foregoing frame aligner circuit may consist of:

a buffer memory which performs a write operation at a timing of the receive clock and a reading-out operation at a timing of the transmit clock, absorbs the accumulation of the slip between the timings of said receive and transmit clocks, and allows the receive input signal to generate the data slip and outputs said receive input signal as a reference signal when the slip of the timings exceeds the maximum capacity for accumulating;

a data pointer which indicates a writing/reading address of the buffer memory; and a data slip detector which detects the data slip of the receive input signal.

Still furthermore, according to the present invention, the foregoing echo canceller may consist of:

a first register which stores said reference input signal;

a second register which estimates an impulse response of an echo path;

an adaptation correction section which monitors the data slip from the foregoing data slip detector, and performs a correction operation at the time of a detection of the data slip so that the impulse response of said second register increases a delay equivalent to N taps (N: the number of memories constituting the foregoing buffer memory); and a computing unit which performs a convolution computation for outputs of the foregoing first and second registers.

The above and other objects, features and advantages of the present invention will become apparent from the following description based on the accompanying drawings which illustrate an example of a preferred embodiment of the present invention.

BRIEF DESCRIPTION OF THE DRAWINGS

FIG. 3 is a block diagram showing a detail of a FIFO memory of FIG. 2.

DETAILED DESCRIPTION OF THE PREFERRED EMBODIMENTS OF THE INVENTION

Next, an embodiment of the present invention will be described with reference to the accompanying drawings.

Figure 1:
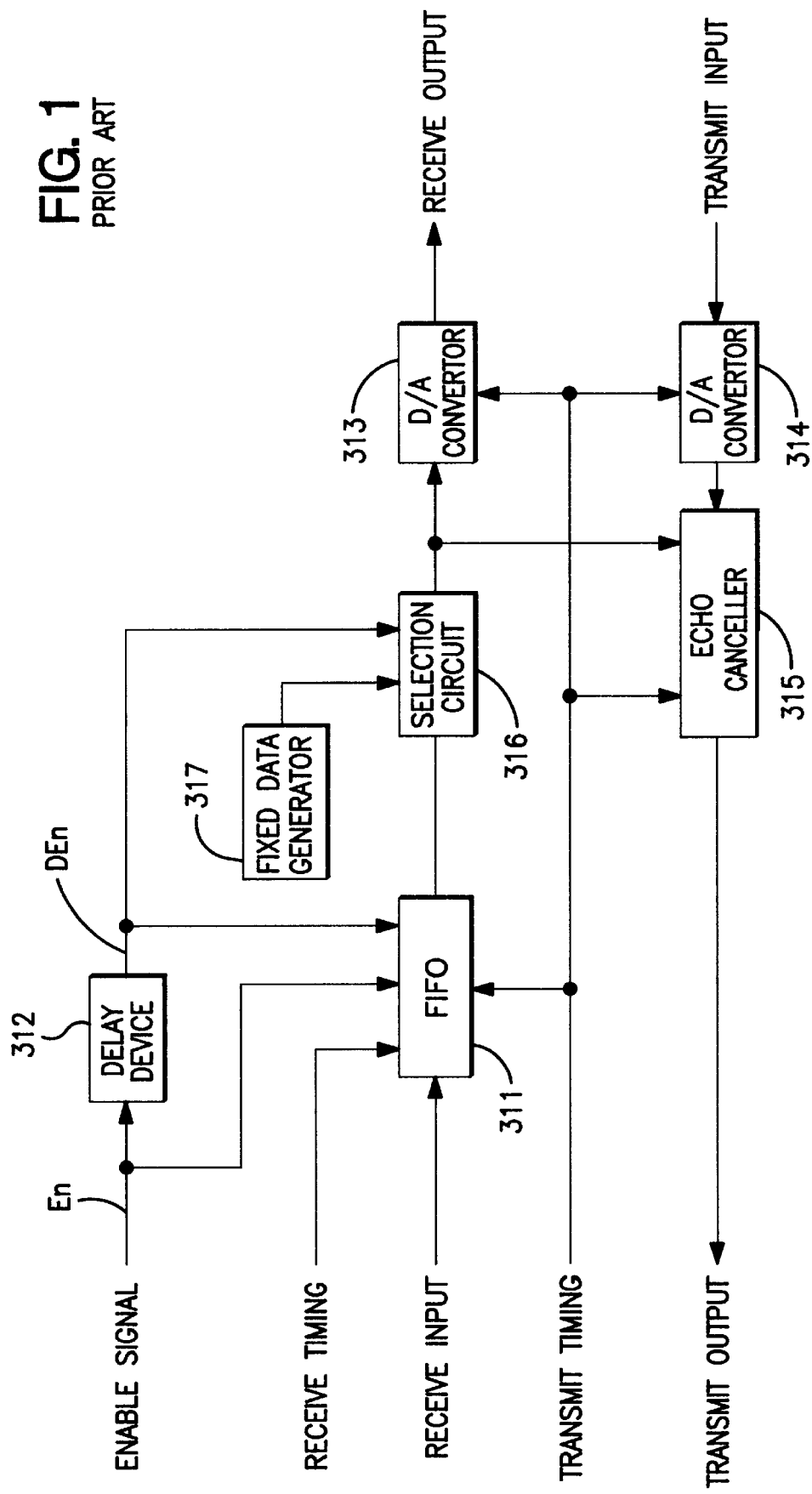
FIG. 1 is a block diagram showing a constitution of a conventional echo canceller apparatus.
Figure 2:
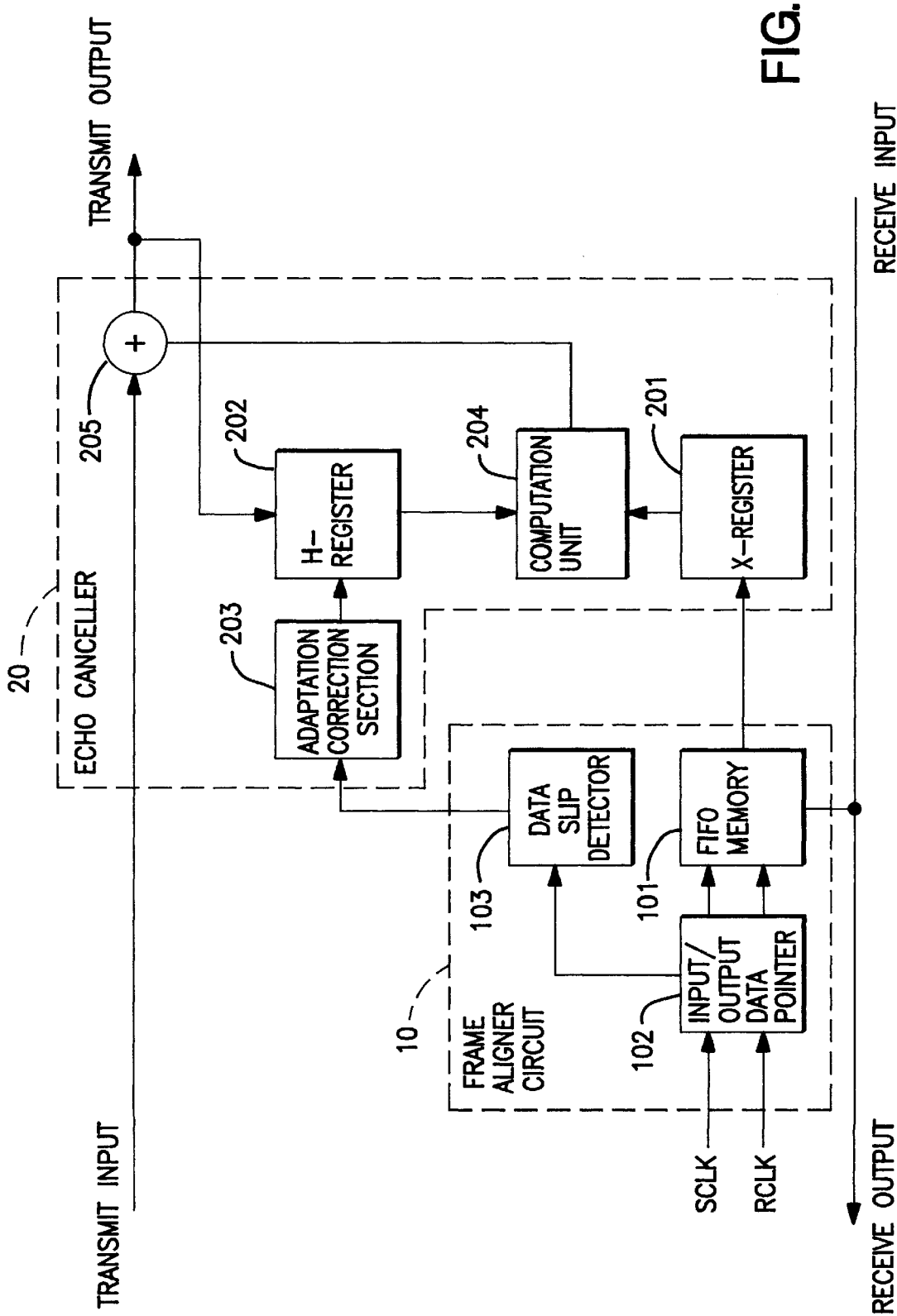
FIG. 2 is a block diagram showing a constitution of an embodiment of an echo canceller apparatus of the present invention.

Referring to FIG. 2, an echo canceller apparatus comprises a frame aligner circuit 10 and an echo canceller 20.

The frame aligner circuit 10 writes a receive input signal at a timing of a receive clock (RCLK) and reads it out at a timing of a transmit clock (SCLK).

Moreover, the frame aligner circuit 10 outputs the receive input signal read out at the timing of the transmit clock to the echo canceller 20. The frame aligner circuit 10 outputs a signal indicating a generation of a data slip of the receive input signal to the echo canceller 20.

The echo canceller 20 estimates an echo component included in the transmit input signal using the receive input signal as a reference input signal, the receive input signal being output from the frame aligner circuit 10, and thereby generates an echo signal (a pseudo echo signal). The echo canceller 20 subtracts the foregoing echo signal (the pseudo echo signal) from the transmit input signal including an echo signal (a true echo signal) to remove the echo component and transmits the transmit input signal from which the pseudo echo signal has been removed.

Next, the detailed constitutions of the frame aligner circuit 10 and the echo canceller 20 will be described below.

The frame aligner circuit 10 comprises a FIFO memory 101; an input/output data pointer 102 indicating a write/read address of the FIFO memory 101; and a data slip detector 103 detecting the data slip of the receive input signal from the input/output data pointer 102. Moreover, the input/output data pointer 102 performs a ring counter operation whereby the writing and reading-out of the FIFO memory 101 can be realized in a recursive buffer style.

The echo canceller 20 comprises an X-register 201 which stores the reference input signal; an H-register 202 which estimates the impulse response of the echo path; an adaptation correction section 203 which performs a correction of the H-register 202; a computation unit 204 which performs a convolution computation of the X and H-registers 201 and 202; and an adder 205 which performs a removal of the echo component. The adaptation correction section 203 performs an adaptation correction of the H-register 202 from the transmit output signal and the receive input signal, the transmit output signal being output from the adder 205 and the receive input signal being the output from the frame aligner 10. Moreover, the adaptation correction section 203 receives the output signal from the data slip detection circuit 103 in the frame aligner circuit 10.

Next, an operation of the echo canceller apparatus will be described with reference to FIG. 3.

The frame aligner circuit 10 performs the write/read operation for the receive input signal of the FIFO memory 101 in synchronization with the receive and transmit clocks. When the receive clock and the transmit clock are synchronous with each other, the input/output data pointers 102 of the FIFO memory 101 perform the ring counting at the same timing. Therefore, the write and read addresses cycle while indicating the same address.

On the other hand, when the receive and transmit clocks are asynchronous with each other, the FIFO memory 101 performs the write operation at the timing of the receive clock, and performs the read operation at the timing of the transmit clock, thereby absorbing the slip of the timings. Moreover, when the slip between the timings of the receive and transmit clocks accumulates, for example, when the receive clock is relatively faster than the transmit clock, the FIFO memory 101 can absorb the accumulation of the slip until the maximum capacity (N samples). Specifically, since the input data pointer (DP2) performs the counting operation at a timing faster than that of the output data pointer (DP1), the input/output data pointer 102 of the FIFO memory 101 relatively produces the slip in the data pointer by accumulating the slip of the timings in the FIFO memory 101. Assuming that an address of the output data pointer (DP1) indicates an address i, the input data pointer (DP2) performs the ring counting operation until the address reaches the address i-1, whereby the accumulation of the slip can be absorbed by the N samples at the maximum.

Next, when the slip between the timings of the receive and transmit clocks exceeds the maximum capacity to be accumulated, the data slip of the receive input signal is forcibly generated by a recursive buffer of the FIFO memory 101. Assuming that an address of the output data pointer dp1 indicates the address i, the output data pointer dp1 indicates the address i exceeding the address i-1 which is the maximum capacity of the absorption of the slip, whereby the data slip of the receive input signal before the N samples is generated.

By the data slip of the input signal, the echo canceller 20 apparently increases the delay by the N samples on the echo path. Therefore, the data slip detector 103 which detects the data slip of the receive input signal outputs the detection of the data slip to the adaptation correction section 203 of the echo canceller 20.

In the echo canceller 20, by subtracting the pseudo echo signal from the transmit input signal, the pseudo echo signal being estimated using the receive input signal read out according to the timing of the transmit clock of the FIFO memory 101 of the frame aligner 10 as a reference input signal, the adder 205 removes the echo signal. Moreover, when in the adaptation correction section 203 the data slip of the receive input signal is detected depending on the output of the data slip detection circuit 103, the correction operation is performed so that the impulse response of the H-register increases the delay by N taps, whereby the echo canceling at the time of data slip is performed.

According to the present invention, since the echo correction operation is performed the moment the data slip is generated so as to increase the time when the data slip is generated, the echo canceller is able to cancel the echo when the data slip is generated.

Furthermore, according to the present invention, since the frame aligner circuit is realized by the FIFO memory of the recursive buffer style and the data slip is detected by forcibly generating it, the echo canceller can recognize the data slip due to the slip between the timings of the receive and transmit clocks.

Although the preferred embodiment of the present invention has been described in detail, it should be understood that various changes, substitutions and alternations can be made therein without departing from spirit and scope of the inventions as defined by the appended claims.

What is claimed is:

1. In an apparatus for echo cancelling on a four-wire path in which a receive clock and a transmit clock are asynchronous with each other, the apparatus comprising:

a frame aligner circuit which writes a receive input signal at a timing of a receive clock and reads it out at a timing of a transmit clock to absorb an accumulation of a slip between timings of said receive clock and said transmit clock, and transmits a data slip recognition signal indicating a generation of a data slip of said receive input signal when the slip exceeds a maximum capacity as a result of an accumulation of the timings; and an echo canceller which receives said receive input signal as a reference input signal, estimates an echo component included in said receive input signal to remove the echo component when said data slip recognition signal output at the time of the generation of the data slip of said receive input signal is input thereto, and thereby cancels an echo signal at the time of the generation of the data slip from a transmit input signal.

2. The apparatus according to claim 1, wherein said frame aligner circuit comprises:

a buffer memory which performs a write operation at a timing of the receive clock and a reading-out operation at a timing of the transmit clock, absorbs the accumulation of the slip between the timings of said receive and transmit clocks, allows the receive input signal to generate the data slip and outputs said receive input signal as a reference signal when the slip of the timings exceeds the maximum capacity for accumulating;

a data pointer which indicates a writing/reading address of the buffer memory; and a data slip detector which detects the data slip of the receive input signal.

3. The apparatus according to claim 2, wherein said echo canceller comprises:

a first register which stores said reference input signal;

a second register which estimates an impulse response of an echo path;

an adaptation correction section which monitors the data slip from said data slip detector, and performs a correction operation at the time of a detection of the data slip so that the impulse response of said second register increases a delay equivalent to N taps, where N is a number of memories constituting the foregoing buffer memory; and a computing unit which performs a convolution computation for outputs of the foregoing first and second registers.

* * * * *